United States Patent
Alloh et al.

(10) Patent No.: US 11,120,219 B2
(45) Date of Patent: Sep. 14, 2021

(54) USER-CUSTOMIZED COMPUTER-AUTOMATED TRANSLATION

(71) Applicant: INTERNATIONAL BUSINESS MACHINES CORPORATION, Armonk, NY (US)

(72) Inventors: Mustafa Alloh, Um Al Quwain (AE); Robert Huntington Grant, Atlanta, GA (US); Hesham Mohamed Mohamed Ads, AlShrouq (EG); Jessica Mulder, Leersum (NL)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/665,446

(22) Filed: Oct. 28, 2019

(65) Prior Publication Data
US 2021/0124803 A1    Apr. 29, 2021

(51) Int. Cl.
| | |
|---|---|
| *G06F 40/247* | (2020.01) |
| *G10L 15/02* | (2006.01) |
| *G10L 15/00* | (2013.01) |
| *G10L 15/22* | (2006.01) |
| *G10L 15/30* | (2013.01) |
| *G06F 40/263* | (2020.01) |

(52) U.S. Cl.
CPC ......... *G06F 40/247* (2020.01); *G06F 40/263* (2020.01); *G10L 15/005* (2013.01); *G10L 15/02* (2013.01); *G10L 15/22* (2013.01); *G10L 15/30* (2013.01); *G10L 2015/025* (2013.01)

(58) Field of Classification Search
CPC .................. G10L 2015/025; G06F 16/3337
USPC ........................................... 704/2–8
See application file for complete search history.

(56) References Cited

U.S. PATENT DOCUMENTS

| | | | |
|---|---|---|---|
| 7,277,851 B1 | 10/2007 | Henton | |
| 8,478,597 B2 * | 7/2013 | Higgins | G09B 19/06 704/270 |

(Continued)

FOREIGN PATENT DOCUMENTS

| | | |
|---|---|---|
| CN | 105632501 A | 6/2016 |
| JP | 2006227425 A | 8/2006 |
| WO | 2014074498 A1 | 5/2014 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Jesse S Pullias
(74) *Attorney, Agent, or Firm* — Anthony M. Pallone

(57) ABSTRACT

A user-customized method, system and computer program for automated translation from a source language and a target language. The user's native language and accent are detected, from which a set of phonemes is determined which are those that are difficult to pronounce for that user based on his or her native language and accent. A translation engine is applied to translate a fragment of the source language input into target language output, wherein the translation is performed with reference to the synonym database for the target language so as to preferentially avoid word strings in the output that contain phonemes that exist in the user's set of difficult-to-pronounce phonemes.

18 Claims, 11 Drawing Sheets

(56) References Cited

U.S. PATENT DOCUMENTS

| | | | |
|---|---|---|---|
| 8,655,664 B2* | 2/2014 | Tachibana | G10L 13/08 |
| | | | 704/270 |
| 9,431,011 B2 | 8/2016 | Ljolje et al. | |
| 2007/0265845 A1 | 11/2007 | Bennett et al. | |
| 2008/0147404 A1 | 6/2008 | Liu et al. | |
| 2013/0030789 A1 | 1/2013 | Dalce | |
| 2013/0130212 A1* | 5/2013 | Dohring | G09B 19/06 |
| | | | 434/157 |
| 2015/0120293 A1* | 4/2015 | Wohlert | G10L 21/0364 |
| | | | 704/235 |
| 2019/0385480 A1* | 12/2019 | Suzuki | G10L 25/30 |

OTHER PUBLICATIONS

Carbonell et al., "Context-Based Machine Translation", Proceedings of the 7th Conference of the Association for Machine Translation in the Americas, pp. 19-28, Aug. 2006.

\* cited by examiner

| Accent | Phonetic Component | Threshold |
|---|---|---|
| Southern American | Drop "T" | 3.121 |
| Northern American | Drop "T" | 3.199 |
| South Ulster (Irish) | Strong "O" | 3.812 |
| Western British | Drop "R" | 3.554 |
| Egyptian Arabic | Soft "TH" | .731 |

USER-CUSTOMIZED COMPUTER-AUTOMATED TRANSLATION

BACKGROUND

Embodiments of the present invention relate to computer-automated translation that is sensitive to a user's accent.

A translation engine is defined as a component which translates text or speech from a source language to a target language. The translation may include any permutation of speech and text conversion, i.e. speech-to-text, speech-to-speech, text-to-text and text-to-speech.

A given spoken language is based on a closed set of sounds, referred to as phonemes. The set of phonemes differs from language to language and may also differ within a given language according to accent. Accent may be affected by multiple factors including geographical region, social class, religion/denomination, age and gender. An infant has the innate ability to learn any language as a native speaker as his or her so-called mother tongue. However, non-native speakers who learn a language in adulthood or adolescence typically have difficulty in correctly pronouncing words that include phonemes that do not exist in their native language. For example, a common sound in English, the "l" sound, does not exist in Japanese, hence it is replaced by a Japanese native speaker who is not expert in English with an "r" sound. Additionally, Japanese characters are made up of two-letter sounds that end with vowels, making it difficult for Japanese speakers to pronounce words that end with consonants without adding a faint extra sound. Another example would be Tagalog language from the Philippines, whose native speakers pronounce "ph" as "p", so that the "Philippines" sounds more like "Pilipines" when spoken there. Moreover, when comparing one language spoken in different regions, there are differences in the accent spoken. Perhaps the most widely-known intra-language difference is the distinction between American English and British English. Within the English-speaking world there are many divisions, e.g. in Canada, Hong Kong, New Zealand, Australia and South Africa, and within the United Kingdom & Ireland.

The pronunciation difficulty is mirrored by a comprehension difficulty, since the non-native speaker's ear may not be sensitive to differences between two sounds in the non-native language, when the listeners native language has no distinction between the two sounds. For example, a native English speaker may be unable to detect the difference between the "u" and "ü" sounds in German, so may for example be unable to distinguish "Mull" (gauze/lint) from "Müll" (trash/rubbish). This is likely to lead to comprehension errors, especially if the listener's vocabulary only encompasses one of the two words.

U.S. Pat. No. 9,431,011B2 discloses a speech recognition method which improves the accuracy of transcription of speech-to-text by recognizing and then taking account of the accent with which a person is speaking. The system stores a plurality of models, one for each accent of a given language. Each accent model contains a set of phonemes that is specific to the accent. Moreover, a mapping is stored between phonemes with the same meaning in different accents. For example, in Received Pronunciation British or American English the vowel "i" is spoken as "eye", whereas in a Southern States American English accent, the vowel "i" is pronounced "ah" and in an East Anglian British English accent as "oi". In that case, the system labels "i" as "i1", "ah" as "i2" and "oi" as "i3". The system thus assigns each phoneme the same base label with a different suffix. This approach allows the system to appropriately partition training data. The system can track phoneme variants for a user or a group of speakers with a similar accent and apply the appropriate phoneme variants when recognizing their speech. After an amount of listening to a speaker the system is able to recognize a set of phonemes that allow a unique selection of the appropriate model for the speaker's accent, so that subsequent translation can be performed with the phoneme set for that speaker's accent.

JP2006227425A discloses a text-to-text or text-to-speech translator that translates from the source language by selecting words in the target language with reference to a synonym database and a pronunciation difficulty database. The pronunciation difficulty database has pre-stored therein a difficulty factor for pronouncing each of a plurality of word strings. The difficulty factor of a word string is a numeric value automatically calculated by applying a formula to a word string. The example is given of the source language being Japanese, the target language English, and the recipient of the translated text or speech being a Japanese native speaker. The formula is based on counting the number of "l" and "r" sounds in a word string, based on the assumption that these will be indistinguishable to a non-expert Japanese ear. If a provisionally translated word string is indicated as having a high level of pronunciation difficulty in the pronunciation difficulty database, then the translation is changed by swapping out the difficult-to-pronounce word string with a synonym that has less pronunciation difficulty with reference to the synonym database and a lookup of the substitute in the pronunciation difficulty database. For example, "approach" may be changed to the synonym "way", or "length" to the synonym "size". It is also recognized in this prior art document that the pronunciation difficulty that arises from a text-to-text translator (that ultimately requires the translated text to be read out aloud) gives rise to a corresponding comprehension difficulty in a text-to-speech translator, i.e. where the output is an audio output from a speech synthesizer chip. That is, with the example of a Japanese-to-English translation that is output by the speech synthesizer and listened to by a native Japanese speaker, the listener can be expected to have difficulty hearing the difference between "l" and "r" sounds (e.g. "light and write"), so a synonym containing neither an "l" nor an "r" sound is sought as a substitute. The translation engine of JP2006227425A is thus sensitive to the native language (e.g. Japanese) of the person to whom the translation into the target language (e.g. English) is directed. In that way, to assist a (Japanese native speaker) recipient who is required to speak or listen to the (English) translated text, the translated (English) text is composed so as to preferentially avoid words in the target language that contain sounds which the (Japanese native speaker) recipient is predicted to have difficulty in pronouncing or comprehending. This approach thereby avoids causing difficulties for a recipient of the translation who is not a native speaker of the target language by taking account of the recipient's native language when composing the translation.

BRIEF SUMMARY

The present disclosure provides a method, a system, and a computer program for translating between a source language and a target language taking account of an intended recipients language skills.

According to one aspect of the disclosure, there is provided a computer-implemented method for automated translation on a computing device, the method comprising:

providing a translation application comprising a translation engine, wherein the translation engine performs automated translation from a source language into a target language in response to a request from a user, and wherein the translation engine has access to a synonym database in at least the target language;

storing a plurality of languages, wherein the source language and the target language are selected from the plurality of languages, and wherein at least one language of the plurality of languages is sub-classified into a plurality of accents, and wherein for each accent of the plurality of accents there is stored a set of accent-specific difficult-to-pronounce phonemes for a native speaker with that accent;

storing a user profile of the user, wherein the user profile comprises an assigned set of language attributes to the user comprising a native language of the user, an accent of the user in the native language, and a user-specific set of difficult-to-pronounce phonemes of the user;

receiving input from the user in a source language for translation into a target language;

extracting word strings from the source language input; and applying the translation engine to translate the source language input into target language output, wherein, when the target language is not the assigned native language of the user, translation is performed with reference to the synonym database for the target language so as to avoid word strings containing phonemes that exist in the user-specific set of difficult-to-pronounce phonemes.

According to another aspect of the disclosure, there is provided a system for performing the above-described method.

The translation application may be configured to: receive input from the user in a source language for translation into a target language; extract word strings from the source language input using an extraction unit; and apply the translation engine to translate the source language input into target language output, wherein, when the target language is not the user's assigned native language. The translation is performed with reference to the synonym database for the target language so as to preferentially avoid word strings containing phonemes that exist in the user-specific set of difficult-to-pronounce phonemes. When searching for a synonym, the method and system may also include the possibility of selecting a negated antonym (e.g. "not fast" for "slow").

According to another aspect of the disclosure, there is provided a computer program stored on a computer readable medium and loadable into memory of a system, comprising software code portions, when said program is run on the system, for performing the above-described method. The disclosure further includes a computer program product storing the computer program.

The functionality of JP2006227425A is thus extended by providing a translation engine that is also sensitive to the accent of the recipient in his native language, which may be the source language, and/or the level of proficiency of the recipient in the target language when the recipient is not a native speaker of the target language. While JP2006227425A selects words in the target language based on a word-specific pronunciation difficulty score, the proposed method translates according to the recipient's native language and accent, as well as his or her language proficiency in the target language. An accent classifier can be used to select the most suitable translation among possible synonyms that is phonetically compatible with the recipient's language knowledge. It is therefore possible to avoid embarrassing moments by avoiding words in the translation that are hard for the recipient to pronounce (or comprehend) and also by avoiding words that contain vague phonemes that may result in the recipient not being able to speak the word at all (or comprehend the word at all). The translation engine should therefore know the recipient's native language(s), including their accent(s) in that (or those) language(s), either by automatic detection based on the person's speech, e.g. by requiring the person to read out some training text as discussed in U.S. Pat. No. 9,431,011B2, and/or by input of data from or about the recipient, e.g. in a question and answer (Q&A) session.

The proposed translation engine is useful for text-to-text or speech-to-text conversion, when the recipient is intended to read out the translated text. The proposed translation engine is also be useful for text-to-speech or speech-to-speech conversion, when the speech is output to a recipient who is a non-native speaker of the target language, since a non-native speaker will not only have difficulty speaking words containing sounds that do not exist in their native language, but may also have corresponding comprehension difficulty for such words when spoken.

BRIEF DESCRIPTION OF THE DRAWINGS

In the following, the present invention will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Before describing details of the translation application according to embodiments of the disclosure, we describe first an example personal computing device able to host a translation application according to embodiments of the disclosure and also a mobile or tablet device able to host a translation application according to embodiments of the disclosure.

Figure 1:
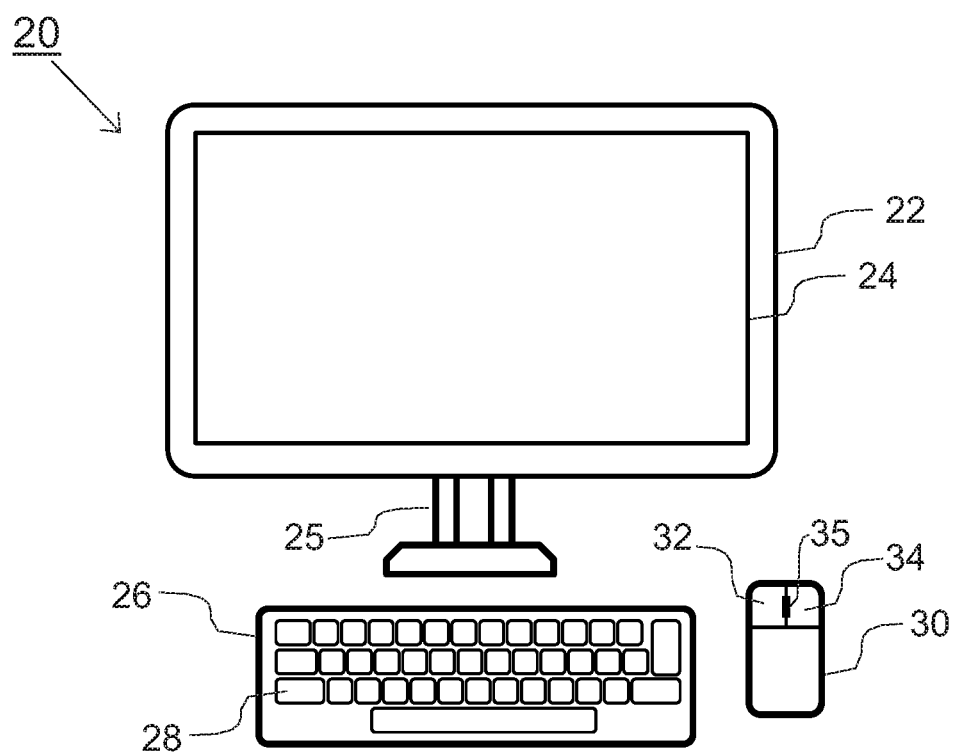
FIG. 1 shows a generic personal computing device on which a translation application may be installed and run, in accordance with an embodiment of the invention.

FIG. 1 shows a generic computing device 20 on which a translation application according to embodiments of the disclosure may be installed and run. The computing device 20 comprises a monitor 22 housing a display 24 and having a stand 25. The computing device 20 further comprises suitable user input/output (I/O) devices with a keyboard 26 and mouse 30 being illustrated. In the case that the display 24 includes an overlaid touch sensor, then the touch sensor will constitute a further I/O device. The keyboard 26 includes a plurality of keys 28, e.g. following a standard QWERTY layout and space bar, with other standard keys such as ENTER, CAPS LOCK, ALT, CTRL, FN and so forth also being provided. The mouse 30 is illustrated as including a left button 32, a right button 34 and a scroll wheel 35. Input from the mouse 30 is used to control the position of a cursor on the display 24 and thus forms part of the graphical user interface (GUI), so that cursor motion may be used to place the cursor over a button icon or other GUI control presented on the display, and then actuation of one of the mouse buttons 32, 34 when the cursor is positioned over such a button icon may be interpreted as pressing the button, thereby providing a cursor-linked button input to the GUI. Further buttons and input elements may also be included, such as in a mouse designed or configured for gaming or other specific application types.

Figure 2:
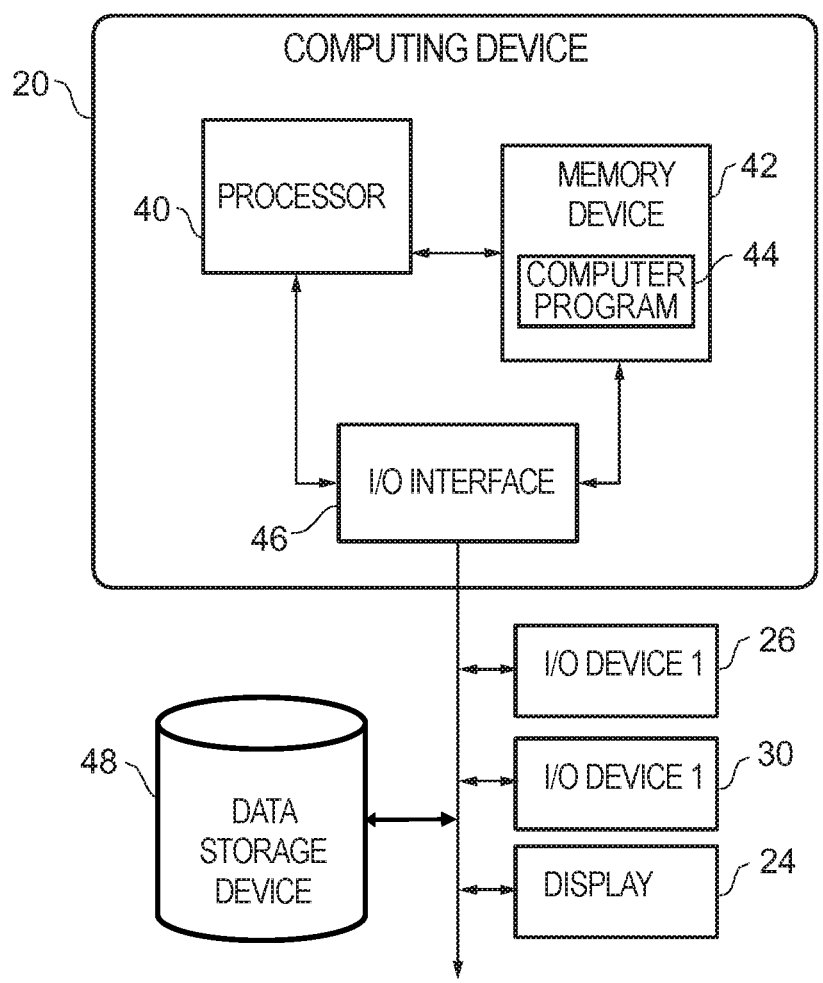
FIG. 2 shows internal structure of the generic personal computing device of FIG. 1, in accordance with an embodiment of the invention.

FIG. 2 shows internal structure of the generic computing device 20 of FIG. 1 in a block diagram. The computing device 20 comprises a processor 40 to provide a processor resource coupled through one or more I/O interfaces 46 to one or more hardware data storage devices 48 and one or more I/O devices 26, 30, which can manage graphic object requests, and the display 24 on which graphics objects can be displayed. The processor 40 may also be connected to one or more memory devices 42. At least one memory device 42 to provide a memory resource contains one or more stored computer programs 44, each computer program comprising a set of computer-executable instructions. An example computer program is a translation application. The data storage devices 48 may store the computer program 44. The computer program 44 stored in the storage devices 48 is configured to be executed by processor 40 via the memory devices 42. The processor 40 executes the stored computer program 44.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
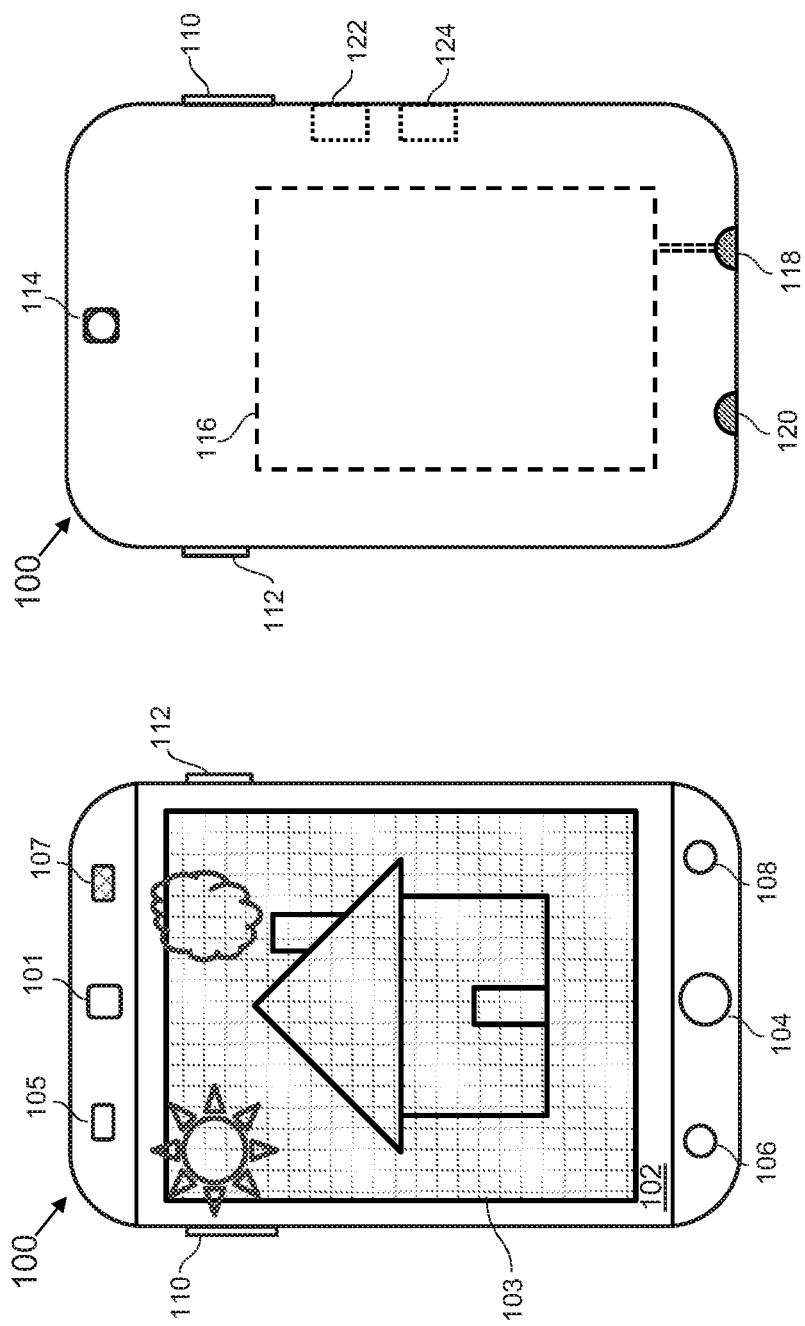
FIG. 3A is a schematic view of the front of a handheld touchscreen computing device, in accordance with an embodiment of the invention.
FIG. 3B is a schematic view of the rear of the handheld touchscreen computing device of FIG. 3A, in accordance with an embodiment of the invention.

FIG. 3A and FIG. 3B are schematic perspective views from the front and behind of a handheld touchscreen computing device, such as a mobile phone or tablet, on which a translation application according to embodiments of the disclosure may be installed and run.

Figure 4:
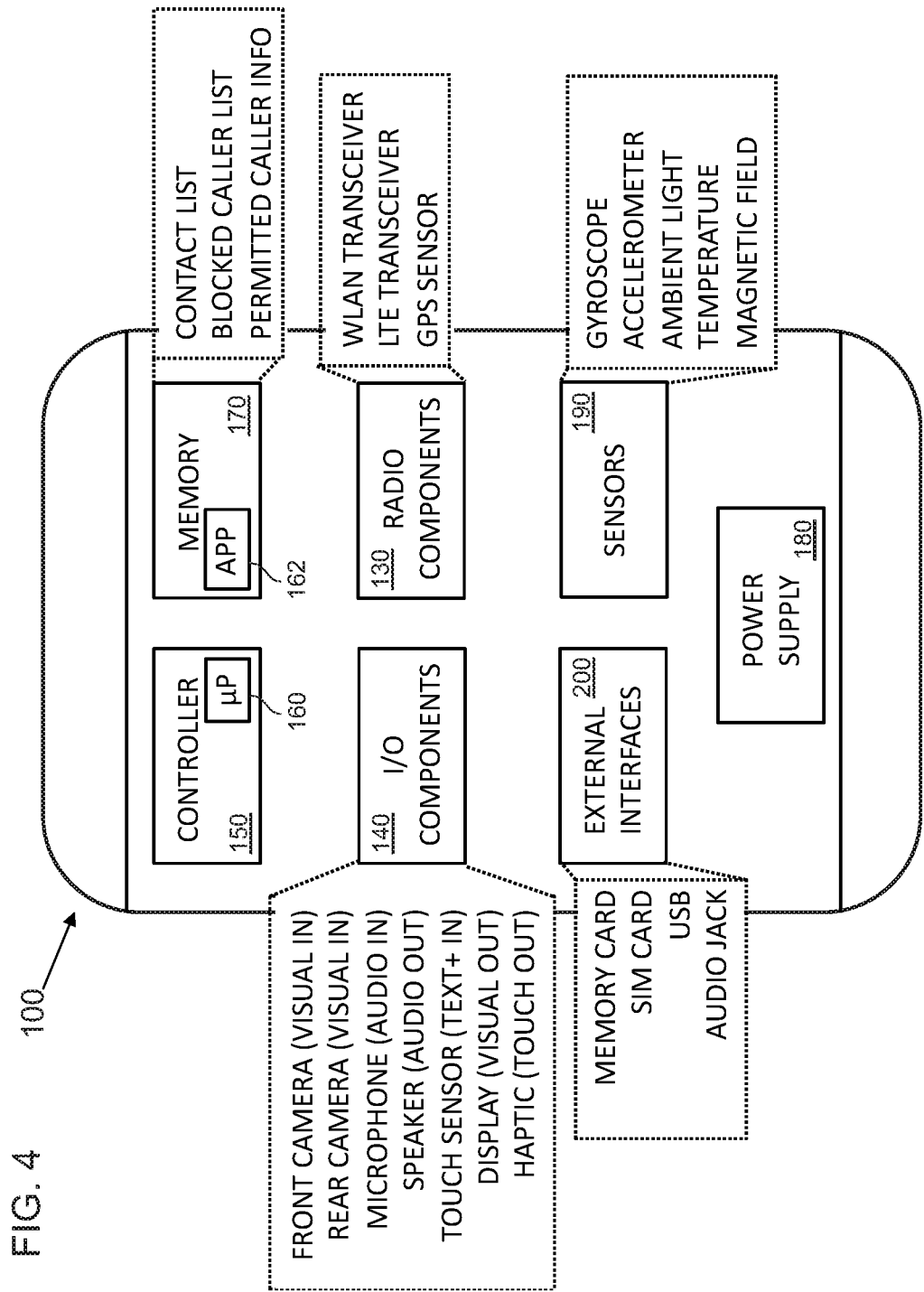
FIG. 4 is a block diagram of the functional components of the handheld touchscreen computing device of FIG. 3A and FIG. 3B, in accordance with an embodiment of the invention.

FIG. 4 is a block diagram of the functional components of the computing device of FIG. 3A and FIG. 3B.

Referring to FIG. 3A, the computing device 100 has a smartphone or tablet format. The computing device 100 is arranged in a housing with a front face (facing outwards from FIG. 3A), a rear face and a bezel forming the edges of a substantially rectilinear object. The front face is mostly taken up with a touch screen display which combines a display 102 (shown displaying a scene with house, smoke and sun) with a touch sensitive area 103 (shown with the hatching). The touchscreen enables the user to input commands to applications running on the computing device through gestures, which vary from the humble single touch of a point on the display to select it, referred to in the art as a tap, and other single touch gestures, such as a swipe, through to multitouch gestures such as the two-finger pinch conventionally used for zooming in and out and rotating. We note that in this document references to gestures means touch gestures on a touchscreen. The front face also accommodates a mechanical key (or button) 104 and two touch sensor keys (or buttons) 106, 108, one either side of the mechanical key 104. The edges of the housing accommodate a mechanical rocker switch 110 for volume control and an on/off switch 112. There is also a haptic layer embedded in the touch screen 102 to provide tactile feedback (not shown).

A front facing camera 101 for capturing stills or video images is arranged on the front face near the top of the housing facing forwards and has adjacent to it a microphone 105 for capturing audio and a speaker 107 for outputting audio.

Referring to FIG. 3B, the rear view, a rear facing camera 114 for capturing stills or video images is arranged near the top of the housing facing backwards. A battery 116 is accommodated within the housing and constitutes a power supply (shown with dashed lines). The power supply further includes an external power input socket 118 which may be used for powering the device as well as charging the battery. Alongside the power input socket 118 at the bottom of the device there is another external connector in the form of an audio jack 120 for audio output. Further external interfaces may be provided including various ports, holders and sockets for physical connections. With dotted lines we show two internal holders 122, 124 which may be for a SIM card and a memory card or further SIM card. The memory card is a kind of data storage device.

Referring to FIG. 4, this shows selected functional components of the computing device 100. The computing device 100 has radio components 130, input/output (I/O) components 140, a controller 150 associated with a processor 160 and a memory 170, a power supply 180, sensor components 190 and external interfaces 200. The memory 170 is operable to store computer programs, typically referred to as computer applications ('apps' for short) 162. Each computer program comprises software code portions that are loadable into and executable by the processor 160. An example computer program is a translation application.

The memory 170 has various memory portions. There is a memory portion for storing a contact list which is a data structure storing the user's known contacts which may be accessible and editable via a database app. There is a memory portion for storing a blocked caller list, which is a data structure storing telephone numbers or other caller identifiers which the user has logged as blocked callers, which may be accessible and editable via an app. There is also a further memory portion in which the user can store descriptions, descriptors or characteristics of calls or types of call which the user wishes to permit, i.e. not block, even if they are not known contacts, these descriptions being accessible and editable via a database app.

The processor 160 may comprise separate processing units for specialist tasks such as video processing, speech/audio analysis and/or speech/audio synthesis, e.g. with the aid of natural language processing. The controller and associated processor have the task of controlling the computing device and executing computer programs stored in the memory. The memory may store computer applications for running on the computing device as well as collecting data from the various I/O devices. The controller typically functions to control overall operation of the computing device, in addition to the operations associated with the application programs. The controller processes signals, data, information and the like input or output through the above-mentioned components and/or runs application programs saved in the memory, thereby processing or providing a user with appropriate information and/or functions. The mobile device 100 is further operable to use its processor 160 to apply filtering to decide whether or not to generate a call alert responsive to detecting an incoming call.

The radio components 130 includes a WLAN transceiver, an LTE transceiver, and a GPS module. The I/O components 140 include a display capable of displaying content and also acting as part of a GUI, wherein the display may be based on a suitable technology such as liquid crystal or organic light emitting diodes, as well as a position-sensitive touch sensor area overlaid on, or formed as an integral part of, the display to serve as part of a GUI in conjunction with the display with optionally other touch sensor areas or buttons (e.g. on the reverse side or edge (bezel) of the device housing. Further I/O components, as previously mentioned, are front and rear facing cameras for capturing stills or video images, a microphone for capturing audio such as speech, a speaker for outputting audio and a haptic output embedded in the touch screen to provide tactile feedback. The sensing components include a gyroscope, an accelerometer, an ambient light sensor and a temperature sensor, for example. The external interfaces may include various ports and sockets for physical connections, such as a SIM card, wired LAN connectors, memory cards, audio jack socket, USB ports and so forth.

The mobile device 100 is operable to use one of its I/O components 140 as an input device, e.g. for audio or text, to allow a user to input a description of a permitted caller. The mobile device 100 is further operable to use one or more of its I/O components 140 as an output device to generate a call alert, e.g. an audio output for sounding a ring tone, or a haptic output to cause the mobile device, or a part thereof, to vibrate.

Figure 5:
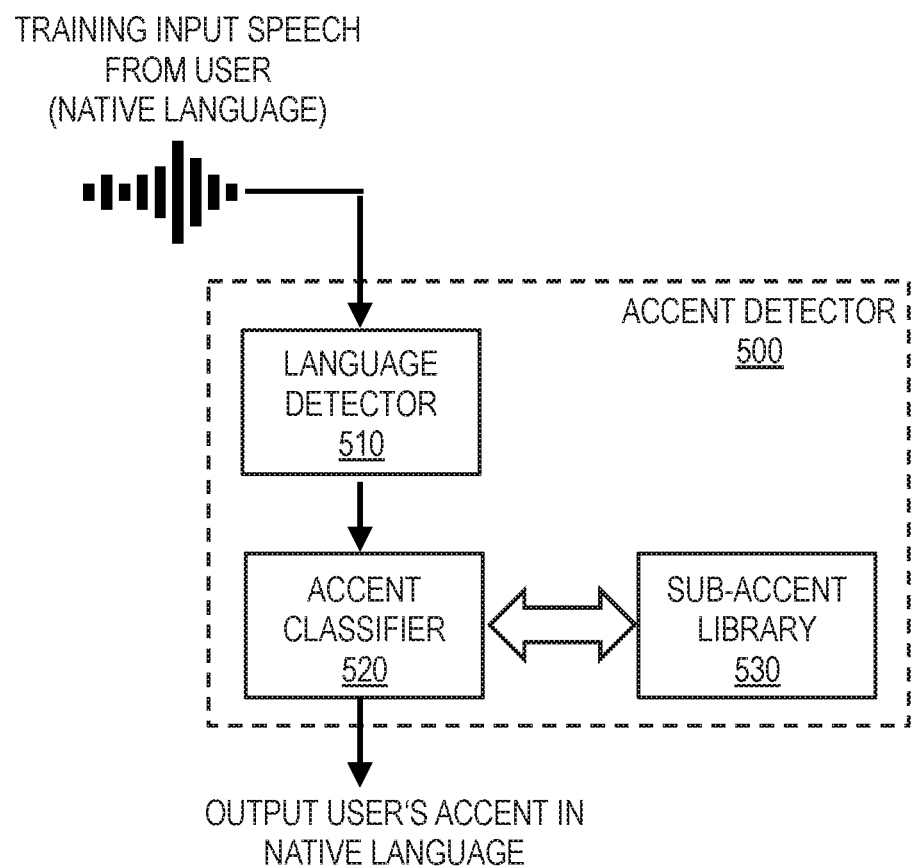
FIG. 5 is a schematic block diagram showing an accent detector module suitable for implementing a first part of the proposed method, in accordance with an embodiment of the invention.

FIG. 5 is a schematic block diagram showing an accent detector 500 suitable for implementing a first part of the proposed method. The principal modules of the accent detector 500 are a language detector 510 (not needed if the language is fixed or otherwise known) and an accent classifier 520 (optionally with sub-accent library 530). The language detector 510 receives speech in the user's native language for training purposes and is operable to detect the language of the speech. Speech input may be gathered from a variety of sources, such as a mobile telephone (smartphone), tablet, virtual or home assistant, or personal computer (e.g. laptop or desktop). The accent recognition takes account of a response time calculated based on the Linear Predictive Coding (LPC) method of speech processing based on processing frames of speech signal (e.g. 30 to 50 frames per second) and is taken as the average formant frequency extracted from the voice signal using the formant extractor after the LPC calculates a polynomial for the voice patterns. Response time (also referred to as spectral envelope) is an estimation of the predictor coefficients estimated in each frame. A language detector (e.g., language detector 510) may be omitted if the user's native language is fixed or has been communicated to the system by other means, e.g. because it is contained in a user profile. The accent classifier 520 also receives speech from the user as input. This may be the same speech as received by the language detector 510 or a different speech, or a superset of the speech used by the language detector 510. The speech provided to the accent classifier 520 preferably contains as many potentially difficult-to-pronounce phonemes as possible for the language detected by the language detector 510. The accent classification may be supported by providing "tongue twister" training text for a user to read out loud, where the text is chosen so that the speech will contain preferably all difficult-to-pronounce phonemes in a particular language, and preferably multiple times, in a relatively short amount of speech.

From the input speech, the accent detector 500 is operable to determine the language (to the extent this is not already proscribed or known) and the accent A in that language with reference to an accent classifier 520 and sub-accent library 530 (which may include sub-accents, or sub-sub-accents in a tree structure, for example in the four levels British English→Northern England→North Eastern→England→Sunderland). Sub-accent libraries (e.g., sub-accent library 530) provide further granularity to accent identification and definition of difficult-to-pronounce phonemes. The sub-accent library 530 could be searched using methods such as Gaussian Mixture Models (GMMs) and Hidden Markov Models (HMMs) or machine learning to determine which sub-accent (or sub-sub-accent) applies to a given speech input. Accent classifiers can be derived through a variety of methods including Principal Component Analysis (PCA), K-Nearest Neighbors (KNN), Support Vector Classifier (SVC), Multi-Layer Perceptron (MLP) and machine learning methods, such as Recurrent Neural Networks (RNNs) with Long-Short-Term Memory (LSTM) or Convolutional Neural Networks (CNNs). The accent is determined to a confidence value associated with difficult-to-pronounce phonemes. For each accent of a particular language, there is a pre-stored set of difficult-to-pronounce phonemes. That is, the difficult-to-pronounce phonemes are stored into different sets and assigned to different accents. For example, there will be a set of difficult-to-pronounce phonemes that are assigned to the Northern American English accent (e.g. the word "Khaled" has strong "kh" in Arabic for which Northern American English speakers find it difficult to pronounce). There will be another set for the Southern Egyptian Arabic accent and so on.

The accent recognition takes account of a confidence threshold for each accent. A confidence value is a value that is used to identify the user's language and accent through comparing this value with pre-stored confidence thresholds assigned to specific languages/accents and their labeled difficult-to-pronounce phonemes. Each accent will have a confidence threshold and will be recorded and stored, e.g. in cloud storage, where a library for accents is stored for one or more languages. This is done through the accent classifier 520 which is used to compare each confidence value obtained from the user's voice with a threshold value stored in the system. The confidence value identified from the user's voice is used to classify the difficult-to-pronounce phonemes based on the user's accent.

The output of the accent detector 500 is the user's accent in the user's native language. This output may then be incorporated in a user profile for the user. The user profile may for example then be initialized with the pre-stored set of difficult-to-pronounce phonemes for a native speaker of language X with accent Y who is speaking in non-native language Y. However, subsequently, this user-specific set may be modified to take account of the user's (non-native) language proficiency in the target language, i.e. the set may be personalized. Namely, by analyzing speech of the user in the target language, e.g. by listening to the user reading out translated text provided by the system, the system can detect whether the user is not afflicted with the full set of expected accent-specific pronunciation difficulties. If the user is quite proficient in the target language, then a significant proportion of the typical pronunciation difficulties may not occur, so the number of phonemes in the user-specific set of difficult-to-pronounce phonemes may be significantly reduced. Refining the user-specific set of difficult-to-pronounce phonemes in a target language may be assisted by training, e.g. by prompting the reader to read out text containing word strings with the full set of difficult-to-pronounce phonemes for the native user's language and accent combination in the non-native target language.

Figure 6:
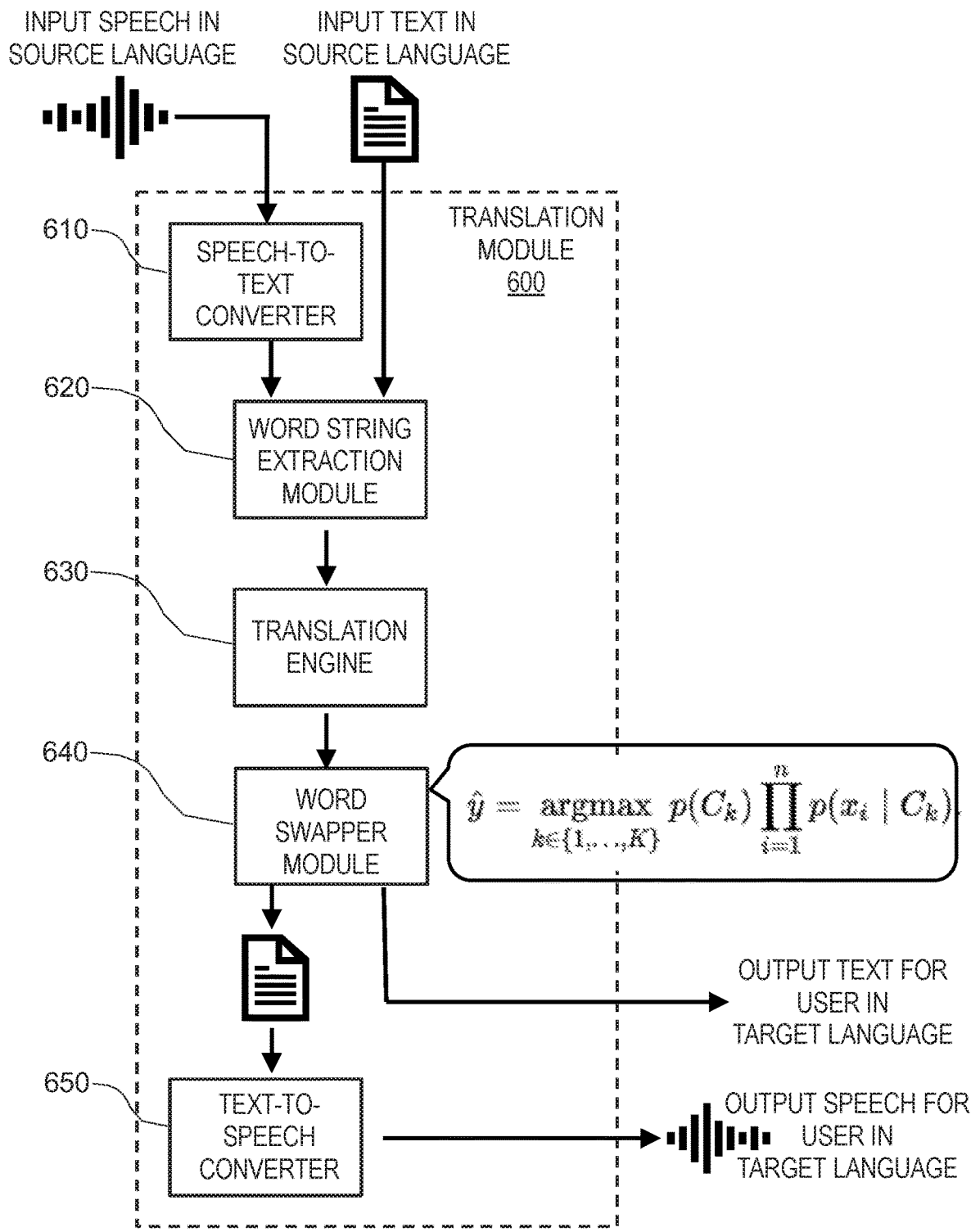
FIG. 6 is a schematic block diagram showing a translation module suitable for translating from a source language to a target language and thereby implementing a second part of the proposed method, in accordance with an embodiment of the invention.

FIG. 6 is a schematic block diagram showing a translation module 600 suitable for translating from a source language to a target language and thereby implementing a second part of the proposed method. The translation module 600 may be implemented in full or in part as a translation application ('app') which includes a translation engine operable to perform automated translation from a source language into a target language on request from a user. The app's translation engine has access to a synonym database in at least the target language, e.g. in local storage or remote storage. The app also stores, or has access to a store of individual language definitions (English, Chinese, Spanish etc.) which are individually selectable as the source language and the target language. The language store may be referred to as a language library. The languages are also sub-classified into accents, at least for any language that is intended to be the source language. For each accent the app stores, or has access to a store of, a set of phonemes which are difficult to pronounce for a native speaker with that accent. The app also stores, or has access to a store containing, user profiles for each user of the app. The user profile of each user is configured to assign a set of language attributes including the user's native language and the user's accent in the native language, as well as a user-specific set of phonemes which are difficult to pronounce for that user. The principal system modules shown are:

Speech-to-text converter 610 (not needed if the input is text)
Word string extraction module 620
Translation engine 630
Word swapper module 640 providing text output
Text-to-speech converter 650 for speech output The speech-to-text converter 610 receives as input speech in a source language and converts the speech into text. The source language may be identical to the user's native language, but this need not be the case. The source language could be an arbitrary third language, i.e. neither the user's native language nor the target language. It is also noted that the target language will not generally be the user's native language, since this would usually serve no useful purpose given that the user can be expected to have no pronunciation difficulty in his or her native language. An exception would be if the propose method was being used by a native speaking user with a speech sound disorder in order to compose text that avoided words impacted by the user's speech sound disorder, e.g. s-phoneme pronounced as θ-phoneme ('thilly' for 'silly') or r-phoneme as w-phoneme ('wabbit' for 'rabbit').

The translation engine 630 is operable to receive input text in a source language, to translate the source language text into target language text, and to output the translated target language text. The initial translation as generated and output by the translation engine 630 is provisional in the sense it is subject to the following subsequent checks in the word swapper module 640 to test whether the initial translation is likely to present any pronunciation difficulties to a speaking user (or corresponding comprehension difficulties to a listening user). The translation engine 630 may employ in one embodiment context-based machine translation (CBMT), thereby generating word strings in the target language. Context-Based Machine Translation (CBMT) is a paradigm for corpus-based translation that requires no parallel text which is based on access to a large target dictionary and a decoding algorithm. A description of CBMT is to be found in Carbonell, J. R., Klein, S., Miller, D., Steinbaum, M., Grassiany, T., & Frey, J. "Context-Based Machine Translation" Proceedings of the 7th Conference of the Association for Machine Translation in the Americas (AMTA), pages 19-28 (2006) Cambridge, the entire contents of which are incorporated herein by reference. CBMT relies on a lightweight translation model utilizing a full-form bilingual dictionary and a sophisticated decoder using long-range context via long n-grams and cascaded overlapping. The translation process is enhanced via in-language substitution of tokens and phrases, both for source and target languages, when top candidates cannot be confirmed or resolved in decoding. Substitution utilizes a synonym and near-synonym generator implemented as a corpus-based unsupervised learning process. Decoding requires a very large target-language-only corpus, and while substitution in target can be performed using that same corpus, substitution in source requires a separate (and smaller) source monolingual corpus.

The word swapper module 640 is operable to receive the target language text from the translation engine 630, which is treated by the word swapper module 640 as a provisional translation that needs to be tested for suitability for the user. To test the suitability of the provisional translation, for each word string a word-specific confidence value is calculated. The word-specific confidence value is then compared to a phoneme-specific confidence threshold by looking up in a database where the confidence thresholds are stored.

A confidence threshold for a particular phoneme is characteristic of how successfully that phoneme is expected to be pronounced when spoken by a non-native speaker with a specific accent, since the confidence threshold takes account of the difficult-to-pronounce phonemes for the accent that are contained in the word. That is, for each phoneme, multiple confidence thresholds are stored in the database, one for each accent which the database caters for.

If the word-specific confidence value exceeds the phoneme-specific threshold value, then the translated word string is deemed to be unacceptable, i.e. too difficult to be pronounced correctly by the user, and so the system is prompted to look for a suitable substitute word string that the user is capable of pronouncing correctly. If a North American English Speaker is speaking Spanish, then he will be assigned a confidence value and this confidence value is screened against a list of confidence thresholds of difficult-to-pronounce phonemes in the target language (Spanish) until a word string is found that has a confidence value below the threshold, thereby to identify a word string that only contains easy-to-pronounce phonemes in the target language. This approach is mainly used when looking for an easy-to-pronounce synonym of a difficult-to-pronounce word, after the difficult-to-pronounce word has appeared in a machine translation into the target language. Whichever phonemes have confidence values below the threshold are phonemes that are easy for the user to pronounce, whereas whichever phonemes are above the threshold are difficult to pronounce. The search for a substitute is performed by a classifier, such as a Naive Bayes classifier, and a word dictionary which are used in combination to determine a candidate substitute word string (synonym or near-synonym). The classifier, if necessary, iterates through further candidate substitute word strings until one is found with a confidence value below the threshold. Each candidate substitute word string is compared with the phoneme-specific confidence threshold, and the search for substitutes is continued iteratively until one is found that is below threshold, or until there are no further synonyms to use as candidates for substitution. A word string with a word-specific confidence value below the threshold is typically a word string that does not contain a phoneme that is in the set of difficult-to-pronounce phonemes for that specific accent. If no substitute is found with a confidence value below the confidence threshold, then the classifier may select the word string from among the original, provisionally translated word string and its synonyms which has the lowest confidence value.

The role of the word swapper module 640 is thus to identify problematic words in the provisional translated text in the target language, i.e. a word containing one or more phonemes that are difficult-to-pronounce phonemes for the user in the target language, find a candidate substitute word (synonym), and test the candidate substitute word to ascertain if it contains one or more difficult-to-pronounce phonemes. If 'no', then the word swapper module 60 is operable to select the candidate substitute word as the substitute word and replace the problematic word with the substitute word. On the other hand, if 'yes', then the word swapper module 640 is operable to iterate with further candidate substitute words until a suitable one is found. In the event that after all possible iterations no candidate substitute word is found that contains no difficult-to-pronounce phonemes, then the least worst of the candidates is selected, e.g. based on having the minimum number of difficult-to-pronounce phonemes. A Naive Bayes dictionary, or Principal Component Analysis (PCA), can be used to find candidate substitute words, with the iteration being performed such that the candidate substitute words are selected in order of nearest similarity to the problematic word with the most similar word being selected first and the least similar word last. The formula shown in FIG. 6 is for a Naive Bayes classifier, which is an example of how to implement a suitable n-gram word swapping method with reference to a preferably large dictionary. The word swapper module 640 thus outputs target language text that has been optimized for the user through the swapping process.

The target language text can then be output from the translation module 600, where it may then be provided to the user for the user to read out.

If speech output rather than text output in the target language is desired, then the translation module 600 may also include a text-to-speech converter 650 for the target language. The speech in the target language that is output from the text-to-speech converter 650 would thus be optimized for the user in the sense that by avoiding the use of difficult-to-pronounce phonemes it can be expected, or at least assumed, by analogy that the same phonemes will be difficult-to-comprehend phonemes for the user.

A translation application ('app') including the accent detector 500 and translation module 600 described above may be provided. The app can be installed in a user device, such as a mobile telephone (smartphone), tablet, virtual or home assistant, or personal computer (e.g. laptop or desktop).

Figure 7:
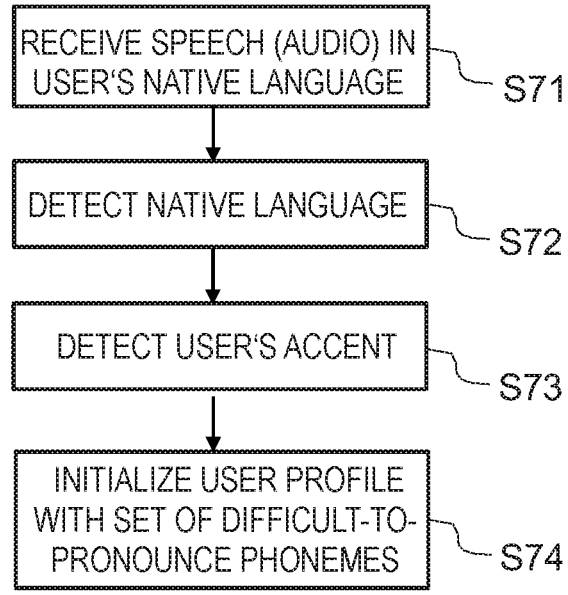
FIG. 7 is a flow diagram showing steps in a training phase of a system as shown in FIG. 5 for a new user, in accordance with an embodiment of the invention.

FIG. 7 is a flow diagram showing steps in a training phase of a system as shown in FIG. 5 for a new user. In Step S71, an audio stream is input with the user speaking in his native language and accent. In Step S72, the audio stream is analyzed to detect the language, and then in Step S73 to detect the accent. In Step S74, the user profile for the new user is then initialized using the set of difficult-to-pronounce phonemes for a person with the identified language and accent combination.

Figure 8:
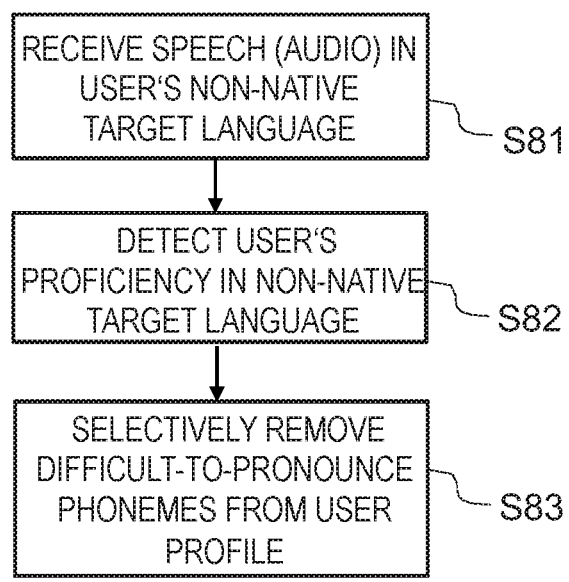
FIG. 8 is a flow diagram showing steps in an additional refinement of the training phase that can be used after the training phase shown in FIG. 7, in accordance with an embodiment of the invention.

FIG. 8 is a flow diagram showing steps in an additional refinement of the training phase that can be used after the training phase shown in FIGS. 5 and 7. A possible outcome of the training phase of FIG. 5 and FIG. 7 is that the user profile is initialized with the user's accent's pre-stored set of difficult-to-pronounce phonemes. However, subsequently, this user-specific set may be modified to take account of the user's (non-native) language proficiency in the target language, i.e. the set may be personalized, as shown in FIG. 8. Namely, in Step S81, speech is input from the user when speaking in the target language, which is generally not their native language. In Step S82, the speech of the user in the target language is analyzed, e.g. by listening to the user reading out translated text provided by the system. The system can detect whether the user is not afflicted with the full set of expected accent-specific pronunciation difficulties, i.e. whether the user is able to pronounce certain difficult-to-pronounce phonemes for the user's native language and accent correctly. Any such phoneme that the user can pronounce correctly can then be removed from the set stored in the user's profile as shown in Step S83. If the user is quite proficient in the target language, then a significant proportion of the typical pronunciation difficulties may not occur, so the number of phonemes in the user-specific set of difficult-to-pronounce phonemes may be significantly reduced. Refining the user-specific set of difficult-to-pronounce phonemes in a target language may be assisted by training, e.g. by prompting the reader to read out text containing word strings with the full set of difficult-to-pronounce phonemes for the native user's language and accent combination in the non-native target language.

Figure 9:
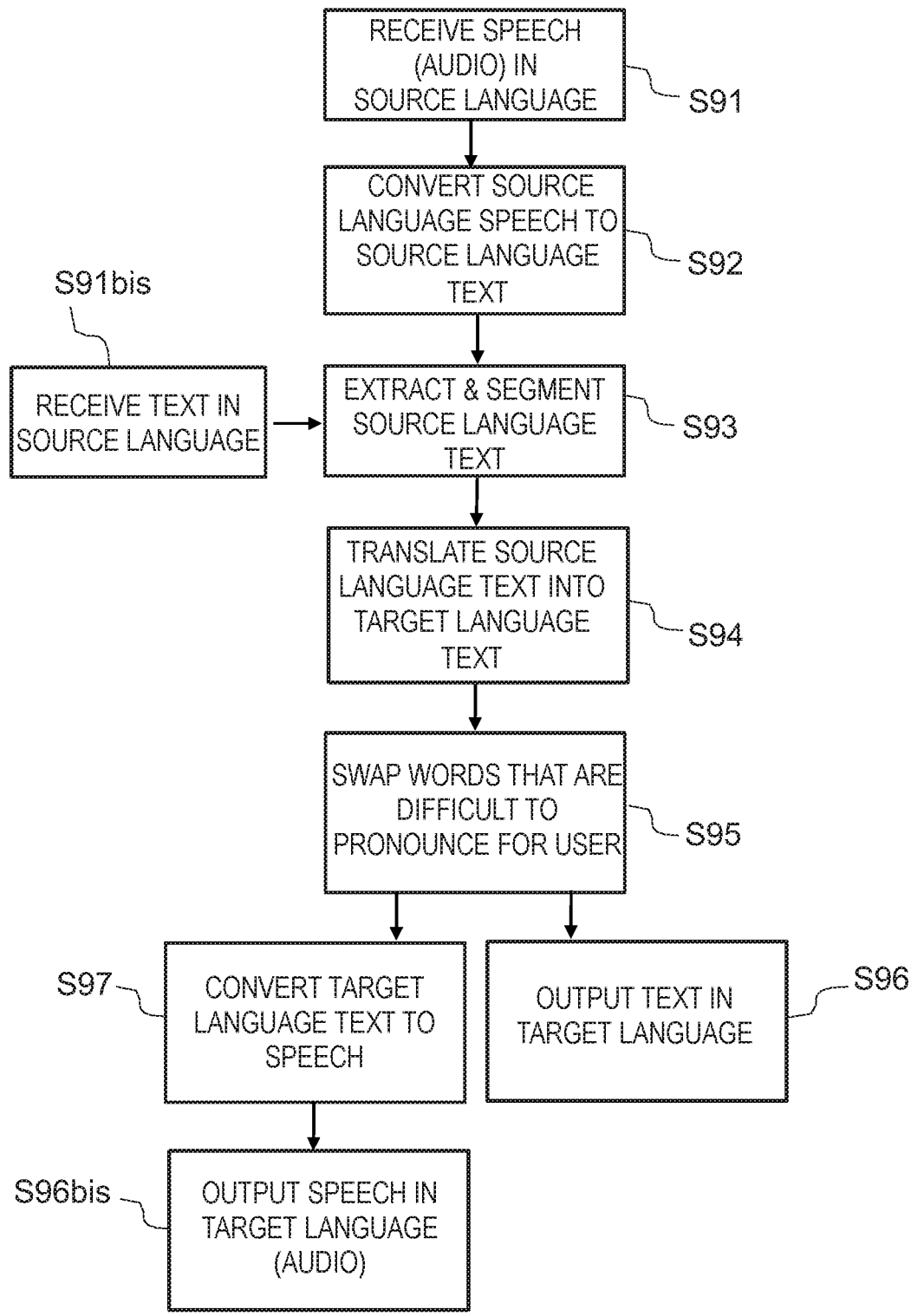
FIG. 9 is a flow diagram showing steps in a translation phase of a system as shown in FIG. 6, in accordance with an embodiment of the invention.

FIG. 9 is a flow diagram showing steps in a translation phase of a system as shown in FIG. 6 which may be implemented as a translation application ('app') as described above.

It is assumed a user has already logged in to the translation application.

In Step S91, the app receives speech input from the user in a source language for translation into a target language. As the input is in the form of speech, then a speech-to-text converter (e.g., speech-to-text converter 610) is applied in Step S92. On the other hand, the app may receive input as text in Step S91bis. In Step S93, a word string extractor (e.g., word string extraction module 620) receives the source language text as input and processes the text to extract and segment word strings.

In Step S94, the extracted word strings are input into the translation engine (e.g., translation engine 630) to translate the source language input into target language output and thereby generate a translation (without reference to the user-specific set of difficult-to-pronounce phonemes).

In Step S95, the 'raw' translation from Step S94 is then output to a word swapping unit (e.g., word swapper module 640) which has the function of filtering the translation with reference to the user-specific set of difficult-to-pronounce phonemes, so as to substitute word strings in the provisional translation that contain one or more phonemes present in the user-specific set of difficult-to-pronounce phonemes with word strings of equivalent meaning selected with reference to the synonym database that do not contain any phonemes present in the user-specific set of difficult-to-pronounce phonemes. The filtered translation is thus an optimized version which preferably avoids word strings containing phonemes that exist in the user-specific set of difficult-to-pronounce phonemes. The word swapping is performed by computing a confidence value for a candidate substitute word string selected from the synonym database. The candidate is only adopted if its confidence value is below the confidence threshold for the user's profile, or, absent the existence of a synonym that is below the threshold, then the candidate with the lowest confidence value may be taken rather than leaving the original word string from the translation step S94. The filtered translation is then output either directly as text (Step S96), or as speech (S96bis) after being routed through a text-to-speech converter (e.g., text-to-speech converter 650) in step S97.

Figures 10, 11:
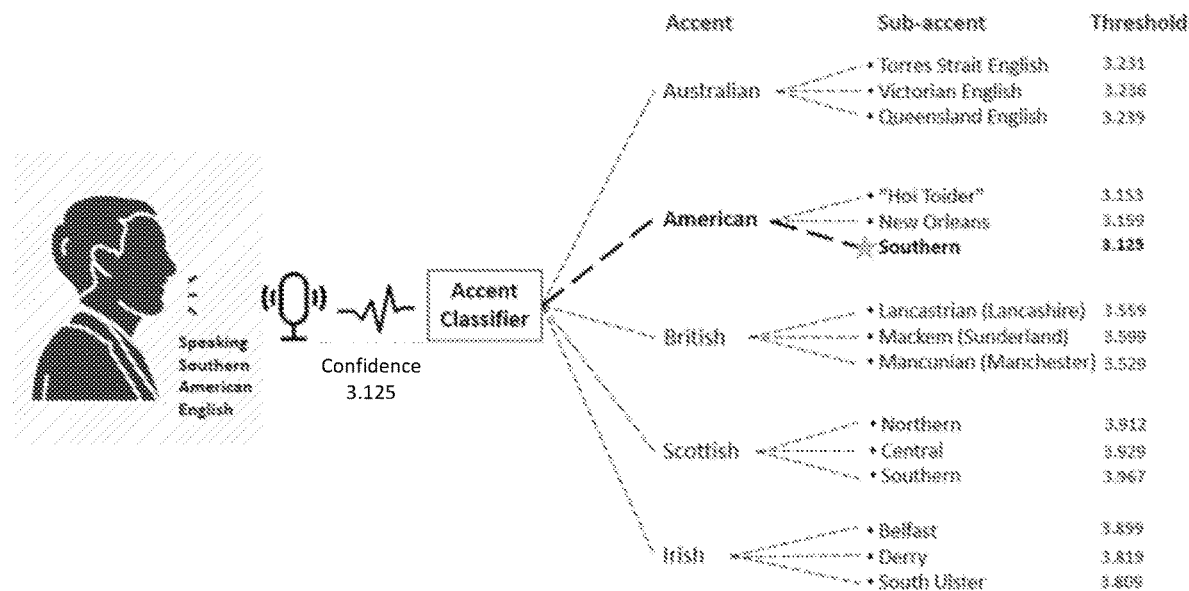
FIG. 10 is a schematic drawing showing how an accent classifier determines the speaker's accent, in accordance with an embodiment of the invention.
FIG. 11 is a table showing a few example accent and phoneme combinations with values for their thresholds, in accordance with an embodiment of the invention.

FIG. 10 is a schematic drawing showing by way of a specific example how in response to listening to speech from a speaker, an accent classifier (e.g., accent classifier 520) determines the language and then accent and then sub-accent of the speech/speaker through determining a threshold for the speech. The threshold could be generated per language, per accent, per sub-accent, per person, or even by incorporating a known speech sound disorder. The threshold represents the likeliness that that person will struggle with a particular phoneme, and if the threshold is exceeded by a particular word (as expected to be spoken by the user), then a below-threshold substitute word is sought. We see that English as a language has a threshold of 3. English is classified into five principal accents: e.g. with British English being 3.5. The accents are further subdivided into sub-accents in tree-like fashion, so that for example Lancastrian British English is 3.5.5 etc. When speech is input, then an accent classifier (e.g., accent classifier 520) determines the accent of the speaker. By way of example, the speaker is speaking with a confidence value determined by the accent classifier (e.g., accent classifier 520) to correspond to Southern American.

FIG. 11 is a table showing a few example accent and phoneme combinations with values for their thresholds. It will be appreciated that a particular accent will typically be associated with multiple difficult-to-pronounce phonemes. For example, the phoneme "r" is pronounced in standard US-English, but not pronounced, i.e. dropped, in British-English generally and "Western British" in particular. Also shown by way of example is South Ulster (Irish) "o" sound, which appears in words such as "wood" which is pronounced "wooood" instead of the standard English "wud". The thresholds shown in the table are the phoneme-specific thresholds discussed further above.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user profiles). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
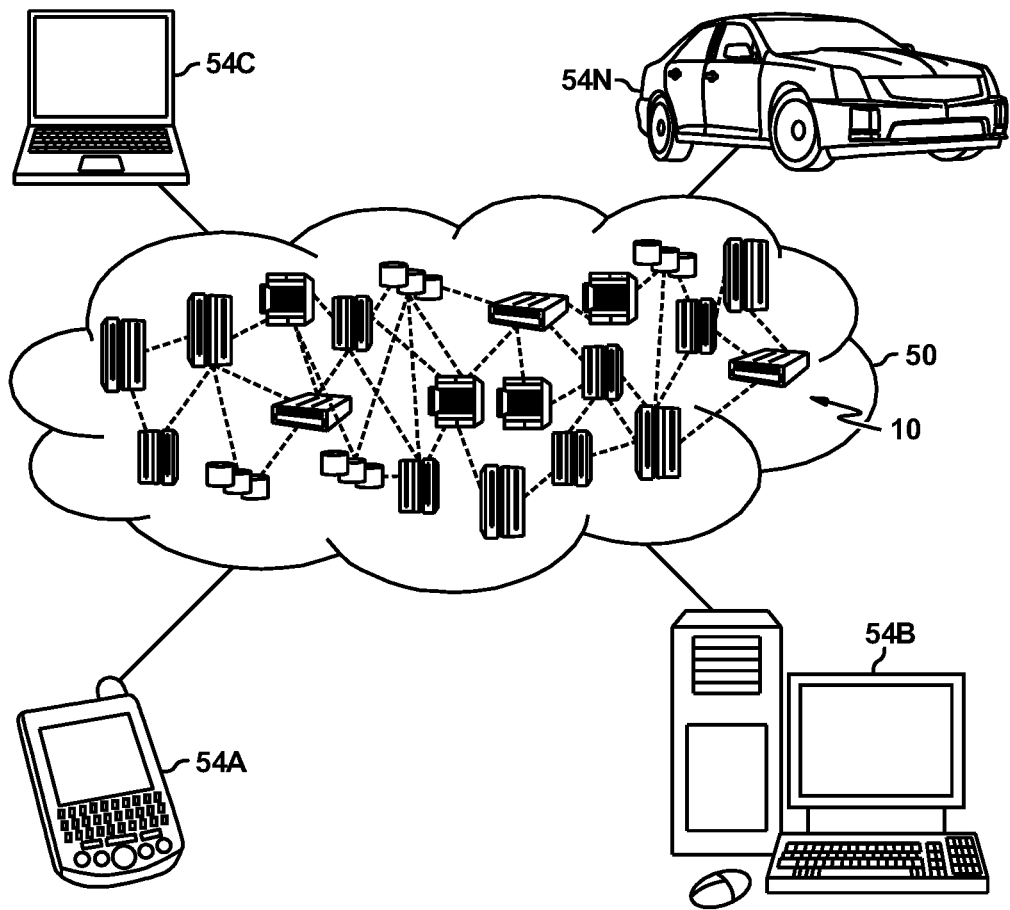
FIG. 12 depicts a cloud computing environment according to an embodiment of the present disclosure, in accordance with an embodiment of the invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection.

A translation application according to embodiments of the disclosure may be installed in the environment of FIG. 12 as follows. One of the cloud computing nodes 10 may host a website from which the add-on may on request be downloaded to a third party computing device such as any of the computing devices 54A, 54B and 54C. The request causes the translation application to be sent as a computer program product from the node 10 via a network connection to the computing device 54A/54B/54C, where the translation application is sent together with an installer for installing the translation application on the computing device.

Figure 13:
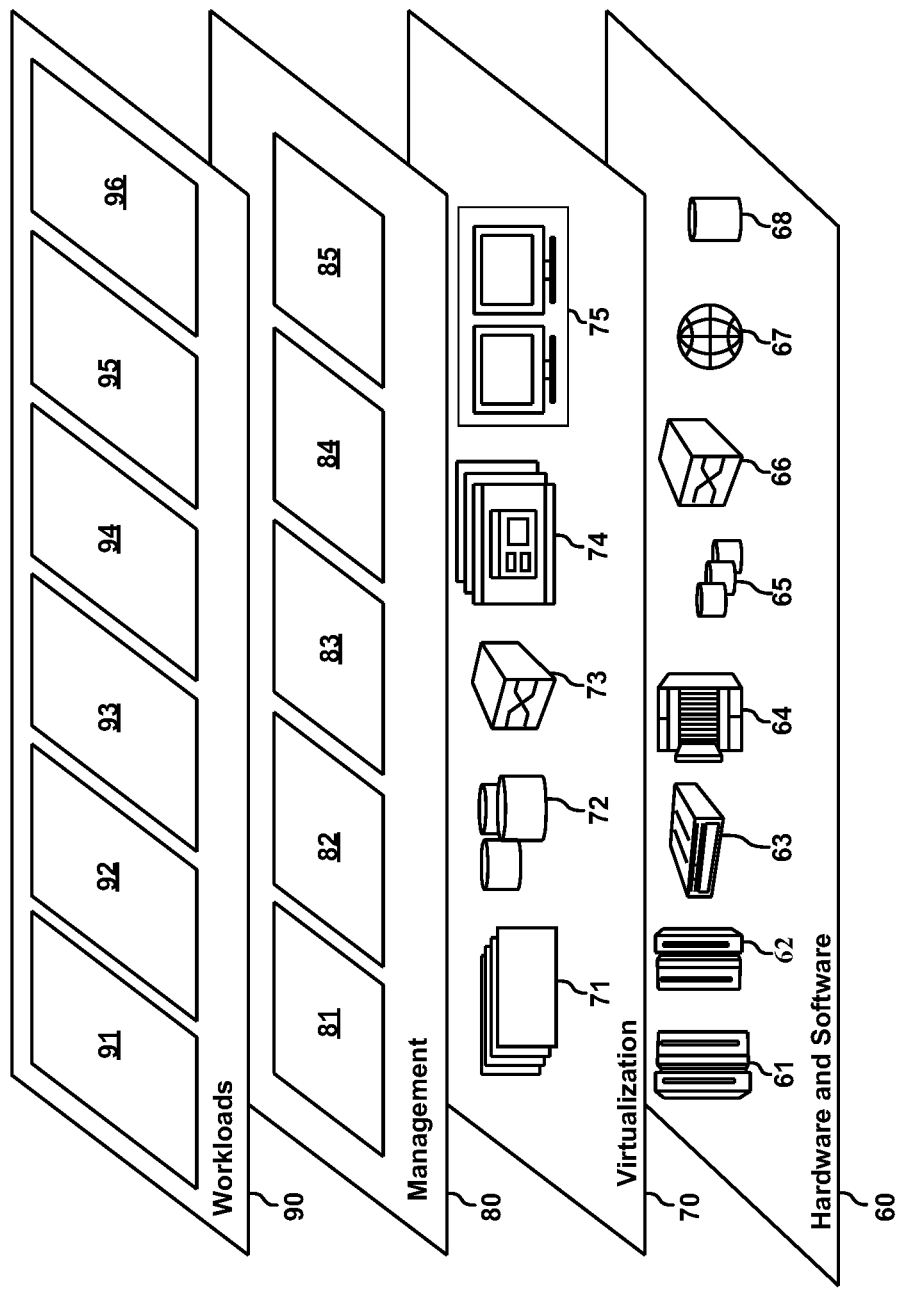
FIG. 13 depicts abstraction model layers according to an embodiment of the present disclosure, in accordance with an embodiment of the invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and a translation application ('app) or component thereof 96 according to embodiments of the disclosure. A translation app component may for example be any one of: a translation engine, a language definition, a synonym database or a user profile database.

It will be clear to one skilled in the art that many improvements and modifications can be made to the foregoing exemplary embodiment without departing from the scope of the present disclosure.

What is claimed is:

1. A computer-implemented method for automated translation on a computing device, the method comprising:
    providing a translation application comprising a translation engine, wherein the translation engine performs automated translation from a source language into a target language in response to a request from a user, and wherein the translation engine has access to a synonym database in at least the target language;
    storing a plurality of languages, wherein the source language and the target language are selected from the plurality of languages, and wherein at least one language of the plurality of languages is sub-classified into a plurality of accents, and wherein for each accent of the plurality of accents there is stored a set of accent-specific difficult-to-pronounce phonemes for a native speaker with that accent;
    storing a user profile of the user, wherein the user profile comprises an assigned set of language attributes to the user comprising a native language of the user, an accent of the user in the native language, and a user-specific set of difficult-to-pronounce phonemes of the user;
    receiving input from the user in the source language for translation into the target language;
    extracting word strings from the source language input; and
    applying the translation engine to translate the source language input into target language output, wherein, when the target language is not the assigned native language of the user, translation is performed with reference to the synonym database for the target language so as to avoid word strings containing phonemes that exist in the user-specific set of difficult-to-pronounce phonemes.

2. The computer-implemented method of claim 1, further comprising:
    applying the translation engine initially without reference to the user-specific set of difficult-to-pronounce phonemes to generate a provisional translation; and
    filtering the provisional translation with reference to the user-specific set of difficult-to-pronounce phonemes, so as to substitute word strings in the provisional translation that contain one or more phonemes present in the user-specific set of difficult-to-pronounce phonemes with word strings of equivalent meaning selected from the synonym database that do not contain any phonemes present in the user-specific set of difficult-to-pronounce phonemes.

3. The computer-implemented method of claim 1, further comprising:
    computing a confidence value for a candidate substitute word string selected from the synonym database; and
    adopting the candidate substitute word string if the confidence value is below a confidence threshold of the user profile.

4. The computer-implemented method of claim 1, wherein the user profile initializes the user-specific set of difficult-to-pronounce phonemes to be the set of accent-specific difficult-to-pronounce phonemes for the native language and the accent of the user.

5. The computer-implemented method of claim 1, wherein the user-specific set of difficult-to-pronounce phonemes of the user is personalized to take account of speech inputs of the user in the target language, when the target language is not the assigned native language of the user, thereby to take account of non-native language proficiency of the user in the target language.

6. The computer-implemented method of claim 1, wherein the accent of the user in the native language is assigned in response to analysis of speech inputs of the user in the native language of the user.

7. A computer program product for automated translation on a computing device, the computer program product comprising
    one or more computer-readable tangible storage devices and program instructions stored on at least one of the one or more computer-readable tangible storage devices, wherein the program instructions are executable by a computer, the program instructions comprising:
        program instructions to provide a translation application comprising a translation engine, wherein the translation engine performs automated translation from a source language into a target language in response to a request from a user, and wherein the translation engine has access to a synonym database in at least the target language;
        program instructions to store a plurality of languages, wherein the source language and the target language are selected from the plurality of languages, and wherein at least one language of the plurality of languages is sub-classified into a plurality of accents, and wherein for each accent of the plurality of accents there is stored a set of accent-specific difficult-to-pronounce phonemes for a native speaker with that accent;
        program instructions to store a user profile of the user, wherein the user profile comprises an assigned set of language attributes to the user comprising a native language of the user, an accent of the user in the native language, and a user-specific set of difficult-to-pronounce phonemes of the user;
        program instructions to receive input from the user in the source language for translation into the target language;
        program instructions to extract word strings from the source language input; and
        program instructions to apply the translation engine to translate the source language input into target language output, wherein, when the target language is not the assigned native language of the user, translation is performed with reference to the synonym database for the target language so as to avoid word strings containing phonemes that exist in the user-specific set of difficult-to-pronounce phonemes.

8. The computer program product of claim 7, further comprising:
    program instructions to apply the translation engine initially without reference to the user-specific set of difficult-to-pronounce phonemes to generate a provisional translation; and
    program instructions to filter the provisional translation with reference to the user-specific set of difficult-to-pronounce phonemes, so as to substitute word strings in the provisional translation that contain one or more phonemes present in the user-specific set of difficult-to-pronounce phonemes with word strings of equivalent meaning selected from the synonym database that do not contain any phonemes present in the user-specific set of difficult-to-pronounce phonemes.

9. The computer program product of claim 7, further comprising:
program instructions to compute a confidence value for a candidate substitute word string selected from the synonym database; and
program instructions to adopting the candidate substitute word string if the confidence value is below a confidence threshold of the user profile.

10. The computer program product of claim 7, wherein the user profile initializes the user-specific set of difficult-to-pronounce phonemes to be the set of accent-specific difficult-to-pronounce phonemes for the native language and the accent of the user.

11. The computer program product of claim 7, wherein the user-specific set of difficult-to-pronounce phonemes of the user is personalized to take account of speech inputs of the user in the target language, when the target language is not the assigned native language of the user, thereby to take account of non-native language proficiency of the user in the target language.

12. The computer program product of claim 7, wherein the accent of the user in the native language is assigned in response to analysis of speech inputs of the user in the native language of the user.

13. A computer system for automated translation on a computing device, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to provide a translation application comprising a translation engine, wherein the translation engine performs automated translation from a source language into a target language in response to a request from a user, and wherein the translation engine has access to a synonym database in at least the target language;
program instructions to store a plurality of languages, wherein the source language and the target language are selected from the plurality of languages, and wherein at least one language of the plurality of languages is sub-classified into a plurality of accents, and wherein for each accent of the plurality of accents there is stored a set of accent-specific difficult-to-pronounce phonemes for a native speaker with that accent;
program instructions to store a user profile of the user, wherein the user profile comprises an assigned set of language attributes to the user comprising a native language of the user, an accent of the user in the native language, and a user-specific set of difficult-to-pronounce phonemes of the user;
program instructions to receive input from the user in the source language for translation into the target language;
program instructions to extract word strings from the source language input; and
program instructions to apply the translation engine to translate the source language input into target language output, wherein, when the target language is not the assigned native language of the user, translation is performed with reference to the synonym database for the target language so as to avoid word strings containing phonemes that exist in the user-specific set of difficult-to-pronounce phonemes.

14. The computer system of claim 13, further comprising:
program instructions to apply the translation engine initially without reference to the user-specific set of difficult-to-pronounce phonemes to generate a provisional translation; and
program instructions to filter the provisional translation with reference to the user-specific set of difficult-to-pronounce phonemes, so as to substitute word strings in the provisional translation that contain one or more phonemes present in the user-specific set of difficult-to-pronounce phonemes with word strings of equivalent meaning selected from the synonym database that do not contain any phonemes present in the user-specific set of difficult-to-pronounce phonemes.

15. The computer system of claim 13, further comprising:
program instructions to compute a confidence value for a candidate substitute word string selected from the synonym database; and
program instructions to adopting the candidate substitute word string if the confidence value is below a confidence threshold of the user profile.

16. The computer system of claim 13, wherein the user profile initializes the user-specific set of difficult-to-pronounce phonemes to be the set of accent-specific difficult-to-pronounce phonemes for the native language and the accent of the user.

17. The computer system of claim 13, wherein the user-specific set of difficult-to-pronounce phonemes of the user is personalized to take account of speech inputs of the user in the target language, when the target language is not the assigned native language of the user, thereby to take account of non-native language proficiency of the user in the target language.

18. The computer system of claim 13, wherein the accent of the user in the native language is assigned in response to analysis of speech inputs of the user in the native language of the user.

* * * * *